United States Patent [19]

Maier-Laxhuber

[11] Patent Number: 5,050,403
[45] Date of Patent: Sep. 24, 1991

[54] COOLING CONTAINER FOR A SORPTION APPARATUS

[75] Inventor: Peter Maier-Laxhuber, Munich, Fed. Rep. of Germany

[73] Assignee: Zeo-Tech (Zeolith Technolgie GmbH), Munich, Fed. Rep. of Germany

[21] Appl. No.: 432,560

[22] Filed: Nov. 7, 1989

[30] Foreign Application Priority Data

Nov. 8, 1988 [DE] Fed. Rep. of Germany ....... 3837880

[51] Int. Cl.$^5$ ............................................. F25B 17/08
[52] U.S. Cl. ...................................................... 62/480
[58] Field of Search .......................................... 62/480

[56] References Cited

U.S. PATENT DOCUMENTS

| | | |
|---|---|---|
| 1,512,623 | 10/1924 | Maxwell . |
| 1,808,056 | 6/1931 | Mitchell . |
| 2,027,571 | 1/1936 | Altenkirch et al. ................... 62/478 |
| 2,053,683 | 9/1936 | Schlumbohm . |
| 2,323,902 | 7/1943 | Kleen . |
| 3,018,638 | 1/1962 | Winkler ................... 62/237 |
| 3,257,817 | 6/1966 | Leonard, Jr. ............................ 62/98 |
| 4,205,531 | 6/1980 | Brunberg et al. ................. 62/480 X |
| 4,250,720 | 2/1981 | Siegel ................... 62/480 |
| 4,479,364 | 10/1984 | Maier-Laxhuber ................... 62/141 |
| 4,531,384 | 7/1985 | Paeye ................... 62/477 |
| 4,581,049 | 4/1986 | Januschkovetz ................. 62/480 X |
| 4,660,629 | 4/1987 | Maier-Laxhuber et al. ... 165/104.12 |
| 4,674,563 | 6/1987 | Maier-Laxhuber et al. ... 165/104.12 |
| 4,682,476 | 7/1987 | Payre et al. ................... 62/480 |
| 4,694,659 | 9/1987 | Shelton ................... 62/480 |
| 4,752,310 | 6/1988 | Maier-Laxhuber et al. ............. 62/4 |
| 4,759,191 | 7/1988 | Thomas et al. ........................ 62/101 |
| 4,802,341 | 2/1989 | Maier-Laxhuber et al. ....... 62/235.1 |
| 4,901,535 | 2/1990 | Sabin et al. ................. 62/480 X |
| 4,924,676 | 5/1990 | Maier-Laxhuber et al. ........... 62/59 |

FOREIGN PATENT DOCUMENTS

| | | |
|---|---|---|
| 410423 | 2/1925 | Fed. Rep. of Germany . |
| 636013 | 9/1936 | Fed. Rep. of Germany . |
| 2720561 | 9/1978 | Fed. Rep. of Germany . |
| 2715075 | 12/1978 | Fed. Rep. of Germany . |
| 513598 | 2/1955 | Italy . |
| 312422 | 5/1929 | United Kingdom . |

OTHER PUBLICATIONS

*Zeolite-Wasser: Neues Stoffpaur Fur Warmepumpen Und Warmespeicher*, Clima Commerze International, pp. 45-46, Feb. 1984, written by Dr. Peter K. Maier-Laxhuber.

Primary Examiner—Lloyd L. King
Attorney, Agent, or Firm—Hoffmann & Baron

[57] ABSTRACT

Disclosed is a cooling container for use in a sorption apparatus. The cooling container is adapted for containing a liquid operating medium, which, during the adsorption phase of operation of the adsorption apparatus, cools off by partial evaporation and solidifies into a solidifying layer starting from the surface of liquid operating medium. In general, the cooling container comprises a vessel and a heat exchanger. The vessel is provided for containing the operating medium, which during the adsorption phase, cools off by partial evaporation and forms the solidifying layer which grows from the surface downwardly into the vessel until the solidifying layer obtains a maximum thickness. The heat exchanger on the other hand is provided for adsorbing heat from a liquid passing through the heat exchanger, and is positioned in the vessel and within the liquid (e.g. beverage) operating medium so that during the adsorption phase, the heat exchanger does not come into contact with the downwardly growing solidifying layer of operating medium, and also so that the liquid operating medium below the solidifying layer transfers the heat adsorbed by the heat exchanger, to the solidified layer of operating medium. Thus, with the cooling container of the present invention, the heat exchanger and liquid (e.g. beverage) passing therethrough are prevented from ever being exposed to temperatures below freezing. Consequently, ice formation within the heat exchanger itself is prevented using a very simply highly effective temperature control mechanism.

5 Claims, 1 Drawing Sheet

COOLING CONTAINER FOR A SORPTION APPARATUS

FIELD OF INVENTION

The present invention relates to a cooling container for a sorption apparatus in which an operating medium cools off therein by partial evaporation and solidifies starting from the surface of the operating medium in the cooling container.

BACKGROUND OF INVENTION

A sorption apparatus is an apparatus wherein a liquid or solid adsorption medium adsorbs a second medium (i.e. the operating medium) as vapor at a higher temperature, thereby releasing heat. During the adsorption phase, the adsorption medium adsorbs the operating medium which is transformed into vapor as it evaporates upon absorbing heat from the heat exchanger in a cooling container. During the adsorption phase, the evaporating temperatures in the cooling container are in the range of between $-40°$ to $+40°$ C.

Sorption apparatus with solid adsorption mediums, referred to as "adsorption" apparatuses, operate periodically, that is, an adsorption phase is always followed by a desorption phase wherein the operating medium (e.g. water) is again separated from the adsorption medium (e.g. zeolite). During the desorption phase, the operating medium cannot evaporate and can therefore not absorb any heat in the cooling container. Also, during the adsorption phase, the "evaporation capacity" in the cooling container is not constant since the sorption force of the adsorption medium depends on several factors; e.g. the temperature of the adsorption medium, and the given concentration of the operating medium in the adsorption medium. In order to maintain a constant evaporation capacity, or a constant evaporation temperature in the cooling container, an additional control effort is necessary with adsorption apparatus in particular.

An example of a prior art cooling container of a periodically-operating adsorption apparatus, is disclosed in German Patent Application DE-OS 35 21 484. In such apparatus, during the adsorption phase, an ice bank is built up during partial evaporation of the water operating medium in the cooling container. In the above-referenced German Patent Application, the adsorption apparatus includes in addition to the cooling container, an adsorption container with a shut off means interposed between the adsorption container and the cooling container. During the adsorption phase, the water operating medium contained in the cooling container, partially evaporates and the remaining portion freezes to form ice. A heat exchanger is also provided in the cooling container and is used for cooling beverages, for example. In connection therewith, the beverage to be cooled is stored in a supply container, and is permitted to flow through the heat exchanger and transfer its heat to the water operating medium which is present in the cooling container. In order to control the discharge temperature of the beverage, a control unit is provided to control the evaporation temperature of the water by opening and closing of the shut off means.

However, such a cooling container suffers from several significant shortcomings and drawbacks. When the control of the shut off means fails, the water operating liquid in the cooling container freezes into ice, which (due to the initiated sublimation process in the cooling container during the adsorption phase) cools down to a temperature far below $0°$ C. Consequently, the beverage which remains in the heat exchanger during this condition, freezes and thus a continuation of the beverage tapping process is interrupted. In addition, the provided control unit and the closable shut off means are complicated and expensive elements which renders such an equipped adsorption apparatus, prohibitively expensive. Consequently, such adsorption cooling apparatus is precluded from being used in a variety of cooling applications.

Accordingly, it is a primary object of the present invention to provide a cooling container for an adsorption apparatus, which incorporates a simple, inexpensive and reliable way of allowing a liquid (such as a beverage) flowing through or remaining in the heat exchanger within the cooling container, from being cooled down below $0°$ C. during the adsorption phase of operation.

These and other objects of the present invention will become apparent hereinafter and in the claims.

SUMMARY OF THE INVENTION

In general, the cooling container of the present invention is for use with a sorption apparatus, and is adapted to contain a liquid operating medium, which, during the adsorption phase of operation of the sorption apparatus, cools off by partial evaporation and solidifies into a solidifying layer starting from the surface of the liquid operating medium. In general, the cooling container comprises a vessel and a heat exchanger. The vessel is provided for containing the operating medium, which during the adsorption phase, cools off by partial evaporation and forms the solidifying layer which grows from the surface downwardly into the vessel until the solidifying layer obtains a maximum thickness. The heat exchanger on the other hand is provided for adsorbing heat from a liquid (e.g. beverage) passing through the heat exchanger, and is positioned in the vessel and within the liquid operating medium so that during the adsorption phase, the heat exchanger does not come into contact with the downwardly growing solidifying layer of operating medium, and also so that the liquid operating medium below the solidifying layer transfers the heat adsorbed by the heat exchanger, to the solidified layer of operating medium.

Thus, with the cooling container of the present invention, the heat exchanger and liquid (e.g. beverage) passing therethrough are prevented from ever being exposed to temperatures below freezing. Consequently, ice formation within the heat exchanger itself is prevented using a very simple, yet highly effective temperature control mechanism.

In the preferred embodiment, the cross-sectional dimension of the vessel in the region of the solidified operating medium, is smaller than the cross-sectional dimension of the vessel in the region of the heat exchanger. Notably, this geometrical condition placed on the cooling container vessel results in a substantially higher vapor pressure drop within the cooling container vessel, and consequentially this higher pressure drop enables the use of a thinner ice layer. Thus, on the way through the thin ice layer, there is a sufficient vapor pressure drop to prevent growth of the ice layer beyond a predetermined distance within the cooling container, as desired.

In the cooling container of the present invention, the volume of liquid operating medium above the heat exchanger is smaller than the maximum volume of the solidifying layer of operating medium during the adsorption phase, and the heat adsorbed by the liquid operating medium from the heat exchanger forms vapor operating medium below the solidifying layer, which flows toward the solidifying layer. Also, in the present invention, using the vapor pressure drop caused by the ice layer formation and the reduced cross-sectional dimension of the cooling container, the maximum thickness of the solidifying layer of operating medium is determined to be sufficient to increase the vapor pressure drop of the vapor operating medium so as to prevent further growth of the solidifying layer beyond the maximum thickness. This restriction of the solidifying (e.g. ice) layer, in turn, prevents the solidifying layer of operating medium from coming into contact with the heat exchanger, and thereby prevents the liquid (e.g. beverage) in the heat exchanger from freezing.

BRIEF DESCRIPTION OF THE DRAWINGS

The subject matter of the present invention will be explained in greater detail by referring to the drawings, in which.

DETAILED DESCRIPTION OF THE PREFERRED EMBODIMENT

Figure 1:
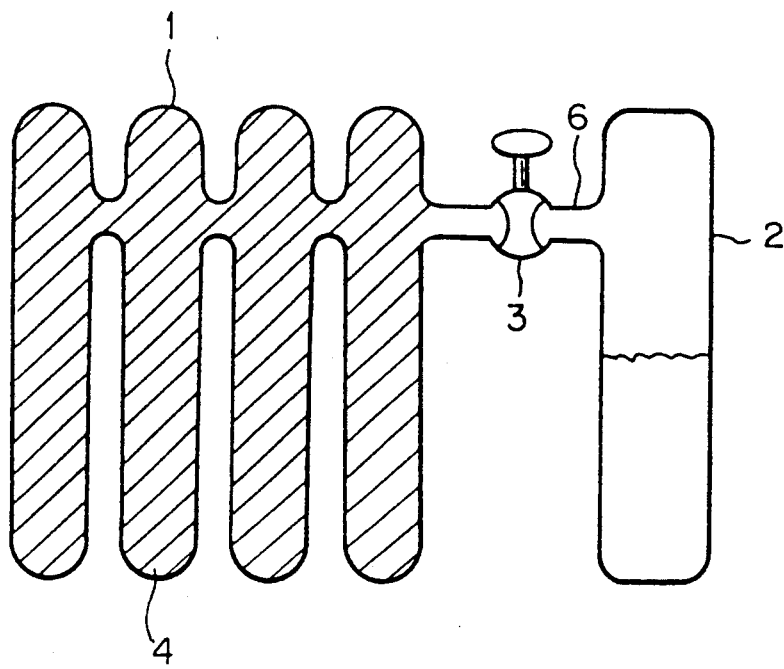
FIG. 1 is a schematic representation of conventional, periodically-operating sorption apparatus.

FIG. 1 illustrates a conventional periodically-operating sorption cooling apparatus comprising an adsorption container 1, a cooling container 2, and shut off means 3. The adsorption container 1 contains the adsorption medium 4 and the cooling container 2 contains the operating medium. While use of a variety of adsorption medium/operating medium pairs are possible with the present invention, in the preferred embodiment hereof, the zeolite/water pair is employed with excellent results.

During the desorption phase, the shut-off means 3 is opened, and the adsorption medium 4 is heated in the adsorption container 1. As a result, the preadsorbed operating medium is desorbed from adsorption medium 4. The desorbed operating medium, in vapor form, flows through the shut off means 3 to the cooling container 2 and condenses therein by releasing heat of condensation. After separating the operating medium from the adsorption medium 4, the shut off means 3 is closed. Thereafter, the adsorption medium 4 is allowed to cool down to the ambient temperature without adsorbing the vapor-like and/or liquid operating medium in cooling container 2.

The shut off means 3 is opened during the adsorption phase. Liquid operating medium can now be evaporated in (i.e. suctioned off from) the cooling container 2 and adsorbed by the adsorption medium 4. During the evaporation of the operating medium in cooling container 2, heat is released from the operating medium and as its temperature drops, it becomes very cold, and initially freezes rapidly to form a layer 9 of ice. This cooling effect can be used in different ways, depending on the use of the sorption apparatus. On the other hand, the heat which is released in the adsorption medium 4 during the adsorption phase, is discharged to the ambient environment through adsorption container 1.

Figure 2:
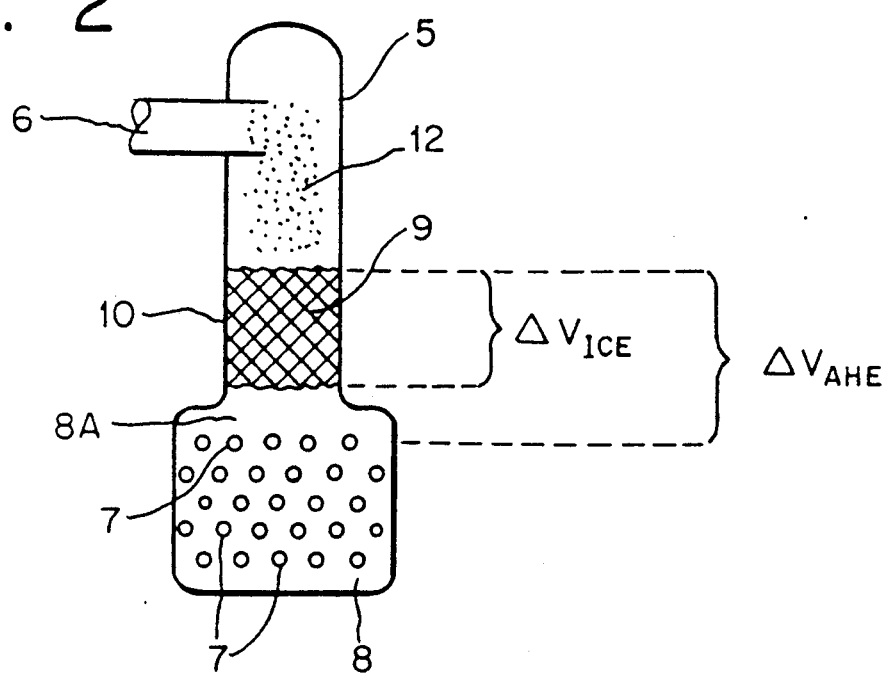
FIG. 2 is a cross-sectional view of a cooling container of the present invention for use in connection with the sorption apparatus of the type shown, for example, in FIG. 1.

Referring now to FIG. 2, there is schematically illustrated a cooling container 5 constructed in accordance with the principles of the present invention. In the preferred embodiment, the cooling container 5 replaces the cooling container 2 of the sorption apparatus shown in FIG. 1.

As shown in FIG. 2, a vapor pipe 6 discharges into the upper part of cooling container 5 with which the cooling container 5 in the preferred embodiment is connected to an adsorption container of the type shown in FIG. 1. A schematically illustrated heat exchanger 7 shown in cross-sectional view, is provided in the lower portion of cooling container 5. As illustrated, this lower portion is flooded with an operating medium 8, such as water, when used for example with zeolite as an adsorption medium 4 in the adsorption container 1. As shown, the water 8 surrounds the heat exchanger 7 in a heat exchanging relationship. An ice layer 9 which forms during the adsorption phase of operation, is shown on top of the water layer 8, and does not reach the heat exchanger 7 as required by the present invention.

Notably, FIG. 2 illustrates the condition of the cooling container 5 shown at a point in time, where the thickness of the ice layer 9 above the water operating medium 8, is maximum. Also, the cooling container 5 of the preferred embodiment has a cross-section in the area of the ice layer 9, which is smaller than in the area of the heat exchanger 7. The purpose of such a geometrical condition on the cooling container 5 of the present invention is to provide a larger vapor pressure drop on the way through the ice layer 9, so that the growth of the ice layer is stopped by a sufficiently high vapor pressure drop present within the cooling container 5. This feature of the present invention will be discussed in greater detail hereinafter.

In accordance with the present invention, the heat exchanger 7 is arranged in the cooling container vessel 5 so that the heat exchanger 7 is not reachable by the downwardly expanding ice layer 9 formed during the adsorption phase of operation. In order to assure this critical condition in the cooling container 5, the water level above the heat exchanger 7 in the cooling container 5 must be present in a sufficient amount at the start of the adsorption phase. This condition can be satisfied for the following reasons. Foremost, since the amount of the adsorption medium 4 in the adsorption container is determined for any given application, the maximum amount of ice generatable in the cooling container 5 per adsorption phase is also pre-determined. Also, provided that the amount of water in the cooling container 5 above the heat exchanger 7 prior to the desorption phase, is larger than the maximum generatable amount of ice during the adsorption phase, then the heat exchanger 7 cannot come into contact with the downwardly growing ice layer 9 formed during the adsorption phase. Thus, it has been discovered that satisfying these two considerations, it is possible to determine (i) the amount of water operating medium for a particular cooling container 5 of selected geometry, to be used in connection with a particular adsorption container having a predetermined amount of adsorption medium; and (ii) what the water level above the heat exchanger 7 must be in order to carry out the present invention. These determinations can be made in a straight forward manner, employing for example, the parameters (i) and (ii) above, and the equilibrium condition specifying that the ice layer completely ceases to grow at a point of equilibrium where the rate of sublimination above the ice layer 9 equals the rate of crystallization (i.e. freezing) of water 8A below the ice layer 9.

In order to generate ice in the cooling container, a portion of the water operating medium in the cooling container must evaporate. During this evaporation process, heat is absorbed initially from the water in the cooling container 5 lowering the temperature thereof, until a portion of the water freezes, thereby producing a "cooling capacity" within the cooling container 5. As is well known, the icing process always starts from the surface of the water, and propagates downwardly. In order not to interrupt the icing process, water 8A below the ice layer 9 continuously evaporates at the water/ice layer boundary, and ice 9 above the water 8A continuously transforms into vapor 12 by sublimation. As a result, an ice layer 9 of only a few centimeters causes a considerable vapor pressure drop at the ice layer, that is, with respect to the total vapor pressure within the cooling container 5. Consequently, this vapor pressure drop causes the ice layer 9 to grow more slowly as the ice layer 9 grows thicker, until eventually the ice layer 9 completely stops growing at a point of equilibrium where the rate of sublimation above the ice layer 9 equals the rate of crystallization (i.e. freezing) of water 8A below the ice layer 9.

In FIG. 2, a state of the process hereof is schematically illustrated where the volume of ice $\Delta V_{ice}$ is maximum and consequentially, the volume of water above the heat exchanger $\Delta V_{AHE}$ is minimum; notably, however, at this state, the ice layer 9 does not reach the heat exchanger 7, as required by the temperature control mechanism of the present invention. More or less a theoretical value, $\Delta V_{solid}$ is the maximum volume of ice which can be produced during the entire adsorption phase, that is, if (i) no heat enters the cooling container 5 via the heat exchanger 7, and (ii) if no additional vapor pressure drops occur. As $\Delta V_{solid}$ is a maximum value, $\Delta V_{AHE}$ is less than $\Delta V_{solid}$ during the adsorption phase of practical cooling applications.

Depending on the geometry of the sorption apparatus, the ice layer 9 can cease growing after reaching, for example, 5-20 centimeters in thickness. In connection therewith, the geometry of the cooling container 5 is a critical design parameter, since according to the present invention, modification in the geometry of the cooling container can be used to create vapor pressure drops therewithin, and the maximum volume of ice produced depends on the vapor pressure drops within the cooling container 5. Thus, the following considerations are important with respect to ice layer formation and its limits of growth: the geometry of the cooling container 5; the ambient heat flow through thermal insulation provided to the cooling container 5; additional vapor pressure drops along the path of vapor to the adsorption medium 4; and the instantaneous adsorption rate of the adsorption medium 4 (i.e. mass of operating medium adsorbed per second). Notably, while in the preferred embodiment, thermal insulation is provided to the exterior surfaces of the cooling container 5 where ambient heat exchange is not required or desired, such thermal insulation is not necessary to carry out the present invention.

It has been discovered that in suitably formed cooling containers, for example, the reduction in the cross-sectional 10 dimension of the cooling container 5 above the heat exchanger 7, can be a small fraction of the maximum possible amount of ice $\Delta V_{solid}$. The reason for using such a configured cooling container 5, is that use of a small cross-section 10 means a higher vapor pressure drop over such a region of the cooling container 5, and a higher pressure drop thereabout means a reduction in the thickness of the ice layer 9, necessary to cause ice layer growth to completely stop before reaching the heat exchanger 7 disposed therebelow.

During the adsorption of vapor by the adsorption medium 4, heat of adsorption is released. This heat must be discharged from the adsorption medium 4 so that the adsorption rate of the adsorption medium 4, does not prematurely decrease. As is well known, only so much "cold or cooling power" can be generated in the cooling container 5 as heat is discharged from the absorption container 1. As a result, it is possible to transfer this heat in a controlled manner to the ambient environment, so as to limit or throttle the "cooling power" produced in the cooling container 5. Thus by using this control effect on the "cooling power", together with the increased pressure drop caused by the ice layer formation in the cooling container 5 hereof, it is possible to construct a sorption cooling apparatus which "adjusts" the thickness of ice layer 9 growth using a small column of water over which a relatively thin ice layer can form, thereby protecting the heat exchanger 4 from icing during use.

Caused by the density anomaly of water, water always has a temperature of +4° C. below an ice layer such as ice layer 9 in FIG. 2. Therefore, in the cooling container 5 of the present invention, the liquid to be cooled in the heat exchanger 7 can become no colder than +4° C., as desired. Thus, freezing of liquid (e.g. beverage) in the heat exchanger 7 is not possible when using a cooling container of the present invention. Accordingly, if the beverage flows into the heat exchanger 7 with a higher temperature than +4° C., the heat exchanger 7 transfers heat to the surrounding water layer 8. In turn, the vapor pressure of this water layer increases until the vapor pressure is so high that the water evaporates and condenses on the superimposed ice layer 9. Notably, this process of evaporating and condensing is equal to the heat transfer in an overflooded condenser.

If the hydrostatic pressure above the heated water layer is larger than the evaporation pressure, there is no evaporation at first, but a slow rise or ascent of the heated water layer occurs, thereby decreasing the hydrostatic pressure thereof until the evaporation pressure suffices the hydrostatic pressure to form steam bubbles. The same then rapidly rises, caused by the enormous difference in density, and also condenses on the superimposed ice layer 9. In this manner, a very effective heat transfer mechanism is provided from the heat exchanger 7 to the ice layer 9 lying above the water layer 8, all without cooling the heat exchanger 7 below +4° C. as desired.

This additional advantage of highly effective heat transfer from the heat exchanger 7 to the ice layer 9, can also be used in conventional ice storage buffers if the conventional ice storage buffers are placed under a vacuum, so that the evaporation and condensation processes can occur at such low temperatures.

In beverage cooling applications, beverage tapping temperatures of +4° C. to +8° C. are achievable using the cooling container of the present invention. This beverage tapping temperature range is possible with the cooling container hereof without any further control efforts. Using the present invention, thermostatically controlled valves and control of heat transfer away from the adsorption medium 4, are not required.

In an adsorption apparatus constructed in accordance with the principles of the present invention, the shut off means 3 can remain open during the total adsorption phase of operation, and the operating medium (e.g. water) can be continuously adsorbed. The excess "cooling power" which is generated in the cooling container 5, is stored in form of the ice layer or block 9. During the total time of the adsorption phase of operation, the adsorption heat released from the adsorption medium 4, can be transferred to the ambient environment, for example. Also, since the time of adsorption phase operation is substantially longer than the actual beverage tapping time (e.g. the sum of the times in which the beverage to be cooled runs through the heat exchanger 7), the adsorption container 1 used with the cooling container 5 of the present invention, can be equipped with a smaller and therefore more cost effective heat exchanging surface.

The maximum adsorption capacity of the adsorption medium 4 depends on the lowest temperature that the adsorption medium 4 finally attains prior to the adsorption phase. The smaller this end temperature is, the more vapor can be adsorbed in the absorption medium 4, and consequently, much more cooling power can be made available in the cooling container 5. Thus, by using the cooling container of the present invention, adsorption medium process can be used more advantageously at the same time.

While the particular embodiment shown and described above has proven to be useful in many applications involving the adsorption arts, further modifications herein disclosed will occur to persons skilled in the art to which the present invention pertains and also such modifications are deemed to be within the scope and spirit of the present invention defined by the appended claims.

What is claimed is:

1. A cooling container for a sorption apparatus and having an interior chamber, the cooling container comprising:
   a liquid operating medium positioned in a preselected portion of the interior chamber and which, during an adsorption phase of operation of the sorption apparatus, cools off by partial evaporation and solidifies into a solidifying layer starting from a surface of the liquid operating medium;
   a heat exchanger for absorbing heat from a liquid passing through the heat exchanger and being positioned in a preselected portion of the interior chamber; and
   a configuration of the interior chamber and relative positioning of the liquid operating medium and heat exchanger therein cooperating during the adsorption phase to limit the formation of the solidifying layer extending downwardly in the interior chamber to a maximum thickness and preventing the heat exchanger from contacting the solidifying layer and so that the liquid operating medium below the solidifying layer transfer the heat absorbed by the heat exchanger to the solidified operating medium.

2. The cooling container in accordance with claim 1, wherein a cross-sectional dimension of the cooling container in a region of the solidifying layer is smaller than a cross-sectional dimension of the cooling container in a region of the heat exchanger.

3. The cooling container in accordance with claim 1, wherein a volume of liquid operating medium above the heat exchanger is smaller than a volume of the solidifying layer during the adsorption phase, wherein the heat absorbed by the liquid operating medium from the heat exchanger forms a vapor operating medium below the solidifying layer which flows toward the solidifying layer, and wherein the maximum thickness of the solidifying layer is sufficient to increase a vapor pressure drop of the vapor operating medium so as to prevent further growth of the solidified layer beyond the maximum thickness, thereby preventing the solidifying layer of operating medium from coming into contact with the heat exchanger.

4. The cooling container in accordance with claim 1, wherein the liquid operating medium is water.

5. A cooling container for a sorption apparatus and having an interior chamber, the cooling container comprising:
   a liquid operating medium positioned in a preselected portion of the interior chamber and which, during an adsorption phase of operation of the sorption apparatus, cools off by partial evaporation and solidifies into a solidifying layer starting from a surface of the liquid operating medium;
   a heat exchanger for absorbing heat from a liquid passing through the heat exchanger and being positioned in a preselected portion of the interior chamber, the heat exchanger being surrounded by liquid operating medium; and
   a configuration of the interior chamber and relative positioning of the liquid operating medium and heat exchanger therein cooperating during the adsorption phase to limit the formation of the solidifying layer extending downwardly in the interior chamber to a maximum thickness and preventing the heat exchanger from contacting the solidifying layer and so that the liquid operating medium below the solidifying layer transfers the heat absorbed by the heat exchanger to the solidified operating medium.

* * * * *